United States Patent [19]

Waldman

[11] 4,112,213
[45] Sep. 5, 1978

[54] PRESSURE SENSITIVE ADHESIVE TAPES AND METHOD OF MAKING SAME

[75] Inventor: Harold Louis Waldman, Monsey, N.Y.

[73] Assignee: Johnson & Johnson, New Brunswick, N.J.

[21] Appl. No.: 475,707

[22] Filed: Jun. 3, 1974

Related U.S. Application Data

[63] Continuation of Ser. No. 32,756, Apr. 28, 1970, abandoned, which is a continuation-in-part of Ser. No. 399,837, Sep. 28, 1964, abandoned.

[51] Int. Cl.² .................................... C08F 220/12
[52] U.S. Cl. ........................... 526/279; 260/33.6 UA; 427/207 B; 428/355; 526/303
[58] Field of Search .......... 260/80.71, 86.1 R, 86.1 E; 117/122 PH, 122 PS; 427/207 B; 428/355; 450/732.5; 526/279

[56] References Cited

U.S. PATENT DOCUMENTS

| 3,252,825 | 5/1966 | Marzocchi et al. | 117/126 |
|---|---|---|---|
| 3,341,501 | 9/1967 | Hedrick et al. | 260/78 |
| 3,408,420 | 10/1968 | Wiggill | 260/82.7 |
| 3,526,533 | 9/1970 | Jacknow et al. | 117/100 |
| 3,617,362 | 11/1971 | Bemmels et al. | 117/122 |

FOREIGN PATENT DOCUMENTS

| 151,164 | 9/1966 | Argentina. |
|---|---|---|
| 1,456,964 | 9/1965 | France. |
| 142,886 | 9/1965 | New Zealand. |
| 5,257 | 9/1965 | South Africa. |

Primary Examiner—Stanford M. Levin

[57] ABSTRACT

Acrylate pressure sensitive adhesives are prepared having improved internal strength by preparing tacky acrylate polymers containing alkoxy silyl alkyl groups of the general formula

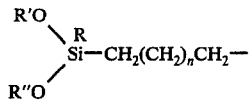

where R' and R" are either $CH_3$— or $CH_3CH_2$— and R is one of the group consisting of $CH_3$—; $CH_3CH_2$—; $CH_3O$—; and $CH_3CHO$—, and n is a number of 0 through 8 in an amount of 0.01 to 1.0 percent by weight, based on the weight of the acrylate polymer, spreading a solution of the acrylate polymer onto a substrate, removing the solvent from the substrate and crosslinking the polymer by heating with or without the presence of a catalyst. The acrylate polymers contain in interpolymerized form at least 50 percent by weight, based on the weight of the polymer, of alkyl acrylate monomer having alkyl group of $C_4$ to $C_{12}$ carbons. Also, in the preferred practice crosslinking is carried out by adding a suitable catalyst to the solution of adhesive prior to spreading the same on a substrate with subsequent solvent evaporation and crosslinking of the polymer.

13 Claims, No Drawings

PRESSURE SENSITIVE ADHESIVE TAPES AND METHOD OF MAKING SAME

This is a continuation of copending application Ser. No. 32,756 filed Apr. 28, 1970, which in turn is a continuation-in-part of application Ser. No. 399,837 filed Sept. 28, 1964, both now abandoned.

BACKGROUND OF THE INVENTION

Acrylate pressure sensitive adhesive, as the term is used herein, refers to tacky acrylate polymer compositions wherein an ester of acrylic acid or methacrylic acid is polymerized, or copolymerized with various comonomers containing a polymerizable ethylenic linkage.

Acrylate and methacrylate pressure sensitive adhesives have many advantageous properties. One of these is their low level of irritation where used in contact with the skin. However, one of the major difficulties with acrylate pressure sensitive adhesives is that when the acrylate or methacrylate polymers are sufficiently soft to possess the required tack or stickiness they are found to have insufficient internal strength to make a completely satisfactory adhesive. As a result, when the adhesive coated article, such for example as an adhesive tape, is removed from an adhered to surface, small particles of the acrylate adhesive tend to still remain. Also, where the adhesive does not have sufficient internal strength, on unwinding strips from a roll of adhesive tape, some of the adhesive is found to transfer to the back of the tape.

The internal strength of the acrylate adhesive can be improved by carrying the polymerization to a higher degree, however, this is found to interfere substantially with the adhesive qualities of the polymer. Also, the internal strength can be improved by use of conventional crosslinking methods such as exposure to electron beam radiation, the addition of peroxide compounds, the inclusion of "self-reactive" pendant groups, such as glycidyl or methylol or the inclusion of "potentially-reactive" groups such as hydroxyl or carboxyl in the polymer. However, here again there is substantial impairment of the stickiness or adhesive qualities of the polymer. For example, electron beam irradiated samples of the acrylate pressure sensitive adhesive, poly (2-ethylhexyl acrylate-co-vinyl acetate), although showing an improvement in internal strength when subjected to doses of 2 megarads, showed a drop in adhesion to human skin of from 70% to 30%.

SUMMARY OF THE INVENTION

It is an object of the present invention to form acrylate pressure sensitive adhesives of improved internal strength.

It is a further object of the present invention to form acrylate pressure sensitive adhesives that can be crosslinked after formation without the formation of degradation product in the polymer. It is a further object of the present invention to form crosslinkable acrylate pressure sensitive adhesives that are stable at normal room temperatures and crosslinkable by heat and/or catalyst addition. It is a still further object of the present invention to provide a crosslinking system in which pressure sensitive adhesive acrylate polymers can be solvent polymerized and then layer crosslinked when desired. Other objects and advantages will become apparent from the following description wherein are set forth by way of illustration and example certain embodiments of this invention.

It has now been discovered that the internal strength of acrylic pressure sensitive adhesives can be substantially increased by incorporating into the acrylic polymer, forming the pressure sensitive adhesive, alkoxy silyl alkyl groups and then, after spreading of the acrylic polymer adhesive and removing solvent from the same, activating the alkoxy silyl alkyl groups with heat, either with or without the presence of a catalyst. Such activation causes interaction within the polymer which substantially increases the internal strength of the polymer and causes the same to become insoluble in organic liquids such as ethyl acetate, methyl ethyl ketone, acetone, cyclohexane, benzene, and toluene. Although the actual mechanism of the internal reaction is not clearly understood, it is thought to be in the nature of a crosslinking reaction. Accordingly, the term "crosslinked" as hereinafter used, both in the specification and claims, refers to polymers in which the polymer with the alkoxy silyl alkyl groups are present have been further treated, as by heating and/or the addition of a catalyst to cause the same to change from a state in which they are completely soluble in toluene to where a substantial portion of the pressure sensitive adhesive polymer is no longer soluble. Also, the term "crosslinkable" as herein used refers to the acrylate pressure sensitive adhesive polymer containing alkoxy silyl alkyl groups but in which the polymer is still completely soluble in toluene, the polymer being subject to crosslinking on removal of the solvent heating with or without the presence of a catalyst. The alkoxy silyl alkyl groups found to be particularly effective are those having the general formula

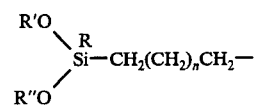

where
R' and R'' are either $CH_3—$ or $CH_3CH_2—$,
and R is one of the group consisting of $CH_3—$, $CH_3CH_2$, $CH_3O—$ and $CH_3CH_2O—$,
and $n$ is a number of 0 through 8.

In practicing the present invention, the alkoxy silyl alkyl group is introduced into the polymer during the polymerization reaction by using in the polymerization reaction a monomer containing such group. The polymerization is carried out in an organic solvent in the conventional manner for forming acrylate pressure sensitive adhesive polymers. The polymerization reaction should, however, preferably be maintained at a temperature of less than about 125° C.

In preparing the pressure sensitive adhesive acrylate polymers of the present invention at least 50 percent of the monomer used should be alkyl acrylate monomer having alkyl group of $C_4$ to $C_{12}$ carbons. The adhesive acrylate polymer may be formed through the interpolymerization of alkyl acrylate monomers with various comonomers containing polymerizable ethylenic linkage. However, as previously indicated, at least 50 of the monomer mix as based on the weight of the final polymer should be made up of one or more alkyl acrylate monomers having an alkyl group of $C_4$ to $C_{12}$ carbons. The active alkoxy silyl alkyl group is tied into the pressure sensitive adhesive polymer by having present in the polymerization reaction a monomer containing this crosslinking group and an active functional terminal group of a type reactive with the other monomers. Examples of such active functional terminal groups are

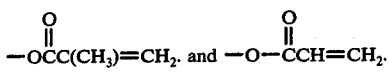

Some examples of such monomers containing both the alkoxy silyl alkyl crosslinking group and the active functional terminal group are: 3-(trimethoxysilyl)propyl methacrylate

and 3-(dimethoxymethylsilyl)propyl methacrylate

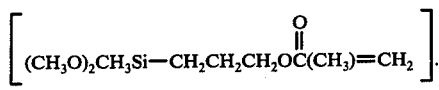

In practicing the invention, an alkoxy silyl monomer is first selected containing the particular functional group necessary to tie the monomer in with the other monomer or monomers in the polymerization reaction. Thus, if it is desired to use in the polymerization reaction only acrylate monomers an alkoxy silyl containing monomer would be used having —OOC—CH=CH$_2$ as a functional terminal group. The compound

is an example of such a monomer. This monomer containing the alkoxy silyl group would then be polymerized with the other monomers used in preparing the particular acrylate polymer it was desired to crosslink. The polymerization would be carried out in the same manner as when the acrylate polymer was prepared without the presence of the alkoxy silyl crosslinking group.

The pressure sensitive adhesive acrylate polymer containing the active crosslinking group may be cross-polymerized by heat alone or through the addition of a catalyst. Where heat alone is used, the organic solvent is first removed and the reactive polymer then heated in air. The temperature and time of heating will depend on the amount of crosslinking group incorporated in the polymer.

Pressure sensitive adhesive acrylate polymers containing the alkoxy silyl alkyl crosslinking group while still in solution and in the absence of a catalyst are found to be quite stable and do not appear to crosslink even at temperatures up to about 125° C. Even after the addition of the catalyst if kept in solution crosslinking will not occur for several hours. This is a substantial advantage where the adhesive is spread from an organic solution or solvent as in the coating with acrylate pressure sensitive adhesive, as the crosslinking substantially decreases the solubility of the adhesive.

Where a catalyst is used, it is preferably of the organo-metallic salt type such as the organo-metallic salts of lead and tin illustrated for example by lead octoate, dibutyltin di-2-ethylhexoate, dibutyltin dilaurate, etc.

The amount of the alkoxy silyl alkyl crosslinking group to be included in the pressure sensitive adhesive polymer is critical. Sufficient should be used to partially crosslink the pressure sensitive adhesive acrylate polymer so as to improve its internal strength. However, if too many alkoxy silyl alkyl groups are introduced, the polymer on crosslinking will be found to lose its pressure sensitive adhesive characteristics. Accordingly, it is important that the alkoxy silyl alkyl crosslinking groups not be introduced in amounts in excess of about 1.0 percent by weight of the acrylic pressure sensitive adhesive polymer with the amount generally not exceeding more than about 0.5 percent by weight of the polymer with the alkoxy silyl alkyl groups generally being present in the range of about 0.01 to 0.50 parts by weight based on the weight of the polymer.

One of the advantages of the present invention is that the acrylate pressure sensitive adhesive can be maintained in its uncrosslinked state, apparently indefinitely, in solution in organic solvents usually used for spreading acrylate adhesives such for example as those solvents heretofore mentioned. When it is desired to prepare a pressure sensitive adhesive tape or other coated sheet, a catalyst is added to the solution of acrylate adhesive and the solution then spread on the flexible backing material. The solvent is then evaporated and the adhesive crosslinked by heating. With the catalyst added the acrylate pressure sensitive adhesive will crosslink on removal of the solvent if permitted to stand a sufficiently long time. However, heating accelerates the crosslinking reaction and is preferably used. The backing would be prepared in the conventional manner for coating with acrylate pressure sensitive adhesives and any of the conventional backing materials may be used.

The following examples, which are given for the purpose of illustration only, further illustrate the practice of the present invention.

EXAMPLE I

Using the same monomers, pressure sensitive adhesive acrylate polymers A, B and C are prepared as follows:

Polymer A. A mixture of 120 g. 2-ethylhexyl acrylate, 50 g. vinyl acetate, 30 g. N-tert-butylacrylamide and 200 g. cyclohexane is heated to reflux under nitrogen and 0.6 g. benzoyl peroxide added. After a total of 4 hours at reflux the highly viscous solution is diluted with an additional 100 g. cyclohexane and the reaction mixture cooled. The (non-volatile) solids content of the solution is determined at 39.2% and the dried polymer has a Williams Plasticity at 100° F., after 15 minutes of 1.80 mm. ASTM method D926-47T.

Polymer B. Using substantially the same procedure and ingredients as in the preparation of Polymer A, with the addition of 0.02 g. of 3-(trimethoxysilyl)-propyl methacrylate to the monomer charge, a polymer is prepared having a solids content of 40.1% and a Williams Plasticity of 1.80 mm, (sample dried at 160° F. for 1 hour).

Polymer C. A repeat of Polymers A & B is prepared using 0.1 g. 3-(trimethoxysilyl)-propyl methacrylate. The resulting polymer has a solids content of 38.2%. A sample dried at 160° F. for 1 hour has a Williams Plasticity of 1.70 mm.

A portion of each of the polymer solutions of Polymers A, B & C is catalyzed with 0.5% by weight dibutyltin di-2-ethylhexoate, bar coated on release paper and subsequently dried for 1 hour at 160° F. The similarity of Polymer B and C to Polymer A, and the substantial improvement in internal strength and decrease in solubility resulting from crosslinking (as shown by the substantial increase in plasticity of the polymer and the determination of the polymer gel) is shown in the following table:

TABLE I

| Polymer | Williams Plasticity, mm | Insoluble,*% Gel |
| --- | --- | --- |
| A | 1.80 | 0 |
| A with catalyst | 1.80 | 0 |
| B | 1.80 | 0 |
| B with catalyst | 1.99 | 10 |
| C | 1.70 | 0 |
| C with catalyst | 3.05 | 55 |

*in toluene, run according to the following procedure:

A 0.500 g. sample of polymer is weighed into a stoppered flask and 50.0 ml of reagent grade solvent is added. The flask is allowed to stand at room temperature for a minimum of 24 hours without agitation. The solution is then decanted through 100 mesh stainless steel screening and the solids determined on a 10 ml aliquot of this solution.

Using the polymer solution of Polymer A and catalyzed Polymer B and Polymer C the polymer solutions are coated into 108 × 52 rayon acetate taffeta backings and the solvent evaporated by drying at a temperature of 160° F. to leave pressure sensitive adhesive coatings of the polymers. The adhesive qualities of the tapes so formed are compared. The substantial improvement in internal strength of the crosslinked polymers without impairment of adhesion is well illustrated by the following table:

TABLE II

| Polymer | Adhesion,%* | Adhesive Transfer,%* |
| --- | --- | --- |
| A | 86 | 30 |
| B | 93 | 14 |
| C | 81 | 0.5 |

*Determined by actual wear testing of 2" × 2" tapes on the backs of 24 human subjects after 72 hours.

In crosslinking pressure sensitive adhesives, it is found that about 0.01 to 1.0% by weight of the crosslinking group should be included as over-crosslinking will affect the final tack of the pressure sensitive adhesive. However, the amount will depend on the particular polymers used and the particular results desired. The effectiveness of the present method of crosslinking in the preparation of pressure sensitive adhesives is further illustrated by the following Table III. In Table III is set forth the degree of crosslinking obtained with different crosslinking monomers and catalysts.

TABLE III

| Adhesive | Percent By Weight of Crosslinking Monomer | Plasticity[a] |
| --- | --- | --- |
| EHA | 1.0[d] | 3.0 |
| EHA | 0.25[d] | 2.7 |
| EHA | 0.1[d] | 2.5 |
| EHA | — | [b] |
| EHA/+BAm 85/15 | — | 0.9 |
| EHA/+BAm 85/15 | 0.05[d] | 1.5 |
| EHA/+BAm 85/15 | 0.1[d] | 2.7 |
| EHA/+BAm 85/15 | 0.2[d] | 3.3[c] |
| EHA/+BAm 85/15 | 1.0[e] | 3.2 |
| EHA/VA 63/37 | 0.05[d] | 2.0 |
| EHA/VA 63/37 | 0.1[d] | 3.3 |

TABLE III-continued

| Adhesive | Percent By Weight of Crosslinking Monomer | Plasticity[a] |
| --- | --- | --- |
| EHA/VA 63/37 | — | 1.5 |

[a]Williams Plasticity, 5 kg load at 100° F. after 15 min.
[b]Polymer to fluid at 100° F. for measurement
[c]Catalyzed with 1% lead octoate based on solids. All of the remaining samples are catalyzed with 1% dibutyltin di-2-ethylhexoate.
[d]Using 3-(trimethoxysilyl) propylmethacrylate.
[e]Using 3-(dimethoxymethylsilyl) propylmethacrylate. EHA-2-ethylhexylacrylate, VA = vinyl acetate, +BAm = N-tert butylacrylamide.

The following examples further illustrate the practice of the present invention in the making of pressure sensitive adhesives. The polymers in each instance on removal of solvent were highly tacky pressure sensitive adhesives.

EXAMPLE II

A mixture of 126 g. of 2-ethylhexylacrylate, 74 g. vinyl acetate, 300 g. cyclohexane and 0.1 g. 3-(trimethoxysilyl) propylmethacrylate is heated to reflux and 1.0 g. benzoyl peroxide added. The reaction is held at reflux for 4 hours at which point the solids content is 40.2%. A sample of this solution is dried at 160° F. for 1 hour in the presence of 1%, based on solids, of dibutyltin di-2-ethylhexoate. The polymer so formed has a Williams Plasticity of 2.0 mm.

A copolymer of 63% 2-ethylhexylacrylate and 37% vinyl acetate prepared in the same manner has a Williams Plasticity of 1.5 mm.

EXAMPLE III

A mixture of 99 g. 2-ethylhexyl acrylate, 150 g. cyclohexane and 1.0 g. 3-(trimethoxysilyl) propylmethacrylate is heated to reflux and 0.5 g. benzoyl peroxide added. The reaction is held for 5 hours at reflux at which point the solid content is determined at 41.7%.

Samples of this solution and of the homopolymer prepared in the same manner without the 3-(trimethoxysilyl) propylmethacrylate are dried at 160° F. for 1 hour, with and without 1%, based on solids, of dibutyltin dilaurate. The catalyzed copolymer has a Williams Plasticity of 3.0 mm and is 73% insoluble in toluene. The homopolymers and the low temperature dried uncatalyzed copolymer are completely soluble in toluene and are to fluid at 100° F. for a plasticity measurement.

EXAMPLE IV

A mixture of 85 g. 2-ethylhexyl acrylate, 15 g. N-tert-butylacrylamide, 150 g. ethyl acetate and 1.0 g. 3-(dimethoxymethylsilyl) propylmethacrylate are heated to reflux and 0.5 g. benzoyl peroxide added. After 5 hours at reflux the solids content is determined at 42.0%.

A sample of this solution is catalyzed with 1%, based on solids, of dibutyltin di-2-ethylhexoate and dried at 160° F. for one hour. The Williams Plasticity of this polymer is 3.2 mm. while an uncatalyzed sample dried under these conditions had a plasticity of 0.7 mm.

It is apparent from the above examples that through the practice of the present invention in the preparation of pressure sensitive acrylate adhesives in that the internal strength of the acrylate adhesive can be increased without the loss of tackiness and quick-stick which substantially increases the range of acrylate polymer compositions that can be successfully employed where the same would have previously been considered too soft for satisfactory use even though having good tack.

The preceding examples, which were given for the purpose of illustration only, clearly show that the internal strength of an acrylate pressure sensitive adhesive can be substantially improved through the introduction of small amounts of alkoxy silyl alkyl crosslinking groups into the acrylate adhesive polymer. Also, the acrylate adhesive polymer can be kept in its uncrosslinked state, in which it is soluble in organic solvents, indefinitely, that is until it is desired to crosslink the same at which time the solvent is removed and the polymer subjected to heating, preferably in the presence of a catalyst. Thus the solvent spreading techniques, which are generally used with acrylate pressure sensitive adhesives, can still be employed.

It should be observed that any acrylate pressure sensitive adhesive can be improved in its internal strength without overly impairing its tack or adhesive qualities. Thus the practice of invention is not limited to the specific examples previously given as the internal strength of other acrylate pressure sensitive adhesive polymer compositions such, for example, as those described in U.S. Pat. Nos. Re. 24,906 and 3,299,011 can be substantially improved in internal strength by including in the polymerization reaction 0.01 to 1.0 parts by weight of active monomers of the type described containing the alkoxy silyl alkyl crosslinking groups. The acrylate pressure sensitive adhesive polymer may be a homopolymer or result through the interpolymerization of two or more monomers in addition to the monomer containing the alkoxy silyl alkyl crosslinking group. As the monomer containing the alkoxy sily alkyl crosslinking group should not be used in amounts in excess of 1% by weight of the total monomer mix and is preferably not used in amounts in excess of 0.5% by weight the term homopolymer, as used herein, is intended to include polymers in which the alkoxy silyl alkyl group containing monomer can be present, in interpolymerized form in amounts up to 1.00% by weight of the polymer.

Particular embodiments of the invention have been used to illustrate the same. The invention, however, is not limited to these specific embodiments. In view of the foregoing disclosure, variations or modifications thereof will be apparent and it is intended to include within the invention all such variations and modifications except as do not come within the scope of the appended claims.

Having thus described my invention I claim:

1. The method of making pressure sensitive adhesive coated articles having acrylate pressure sensitive adhesive coatings of improved internal strength comprising spreading a solution of acrylate pressure sensitive adhesive polymer in organic solvent on a substrate, the acrylate polymer containing randomly interpolymerized therein:
    (a) at least 60% by weight of an alkyl acrylate monomer in which the alkyl group has 4 to 12 carbons; and
    (b) a monomer containing an alkoxy silyl alkyl group, said alkoxy silyl alkyl group-containing monomer being present in an amount sufficient to provide from 0.01% to 1.0% by weight of the acrylate polymer of said alkoxy silyl alkyl groups, said alkoxy silyl alkyl group-containing monomer having the general formula

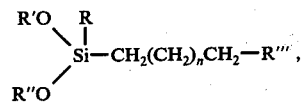

where R' is one of the group consisting of $CH_3$— and $CH_3CH_2$—, R" is one of the group consisting of $CH_3$— and $CH_3CH_2$—, R is one of the group consisting of $CH_3$—, $CH_3CH_2$—, $CH_3O$—, and $CH_3CH_2O$—, R''' is one of the group consisting of

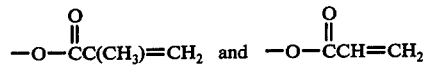

and n is a number selected from the group consisting of 0 and the integers 1 through 8, said alkoxy silyl alkyl group-containing monomer being interpolymerized in said polymer through its ethylenically unsaturated double bond; evaporating off the solvent and heating the coating of pressure sensitive adhesive to crosslink the same.

2. The method of claim 1 in which said substrate is a flexible backing for forming a pressure sensitive adhesive tape.

3. The method of claim 2 wherein an organo metallic salt of lead or tin is added to the polymer solution prior to spreading the same.

4. The method of claim 3 in which said metallic salt is a member of the group consisting of lead octoate, dibutyltin di-2-ethylhexoate, and dibutyltin dilaurate.

5. The method of claim 2 in which said monomer containing an alkoxy silyl alkyl group is selected from at least one of the group consisting of

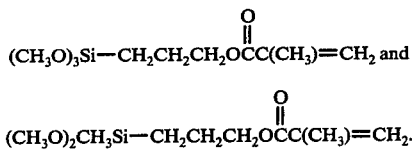

6. The method of claim 2 in which said alkyl acrylate comprises ethylhexyl acrylate.

7. The method of claim 6 in which said polymer further comprises randomly interpolymerized therein at least one monomer selected from the group consisting of vinyl acetate and N-tert-butylacrylamide.

8. The method of claim 7 in which said polymer further comprises randomly interpolymerized therein N-tert-butylacrylamide and vinyl acetate.

9. A pressure sensitive adhesive tape comprising a flexible backing, a coating of crosslinked acrylate pressure sensitive adhesive polymer bonded to at least one side of said backing, said crosslinked acrylate pressure sensitive polymer having an insoluble gel content in toluene, said acrylate pressure sensitive polymer containing randomly polymerized therein:
    (a) at least 60% by weight of an alkyl acrylate monomer in which the alkyl group has 4 to 12 carbons; and
    (b) a monomer containing an alkoxy silyl alkyl group, said alkoxy silyl alkyl group-containing monomer being present in an amount sufficient to provide from 0.01% to 1.0% by weight of the acrylate polymer of said alkoxy silyl alkyl groups, said alkoxy silyl alkyl group-containing monomer having the general formula

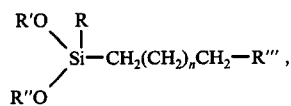

where R' is one of the group consisting of $CH_3-$ and $CH_3CH_2-$, R'' is one of the group consisting of $CH_3-$ and $CH_3CH_2-$, R is one of the group consisting of $CH_3-$, $CH_3CH_2-$, $CH_3O-$, and $CH_3CH_2O-$, R''' is one of the group consisting of

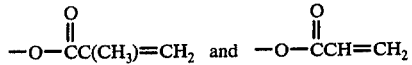

and $n$ is a number selected from the group consisting of 0 and the integers 1 through 8, said alkoxy silyl alkyl group-containing monomer being interpolymerized in said polymer through its ethylenically unsaturated double bond.

10. A pressure sensitive adhesive tape of claim 9 in which said monomer containing an alkoxy silyl alkyl group is selected from at least one of the group consisting of

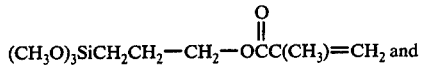

11. A pressure sensitive adhesive tape of claim 9 in which the alkyl acrylate comprises ethylhexyl acrylate.

12. A pressure sensitive adhesive tape of claim 11 in which the acrylate pressure sensitive adhesive polymer further comprises randomly interpolymerized therein at least one monomer selected from the group consisting of vinyl acetate and N-tert-butylacrylamide.

13. A pressure sensitive adhesive tape of claim 12 in which said pressure sensitive adhesive polymer further comprises randomly interpolymerized therein vinyl acetate and N-tert-butylacrylamide.

* * * * *

UNITED STATES PATENT AND TRADEMARK OFFICE
CERTIFICATE OF CORRECTION

PATENT NO. : 4,112,213
DATED : September 5, 1978
INVENTOR(S) : Harold Louis Waldman It is certified that error appears in the above-identified patent and that said Letters Patent are hereby corrected as shown below:

Col. 1, line 66, "layer" should read --later--.

Col. 5, line 60 and Col. 6, line 3 (in the headings of Table III and Table III continued) "Plasticity$^{(a)}$" should read --Plasticity, mm$^{(a)}$--.

Col. 10, lines 5-11, correct the two structural formulas to read as follows:

and

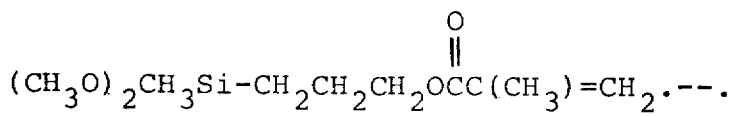

.--.

Signed and Sealed this

*Twenty-eighth* Day of *July 1981*

[SEAL]

*Attest:*

GERALD J. MOSSINGHOFF

*Attesting Officer*     *Commissioner of Patents and Trademarks*